(12) United States Patent
Yamauchi et al.

(10) Patent No.: US 6,617,733 B1
(45) Date of Patent: Sep. 9, 2003

(54) MAGNETIC BEARING APPARATUS AND VACUUM PUMP HAVING MAGNETIC BEARING APPARATUS

(75) Inventors: Akira Yamauchi, Narashino (JP); Manabu Nonaka, Narashino (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/700,640
(22) PCT Filed: Mar. 31, 2000
(86) PCT No.: PCT/JP00/02062
§ 371 (c)(1), (2), (4) Date: Dec. 29, 2000
(87) PCT Pub. No.: WO00/58639
PCT Pub. Date: Oct. 5, 2000

(30) Foreign Application Priority Data

Mar. 31, 1999 (JP) ............................................. 11-093970
Mar. 27, 2000 (JP) ....................................... 2000-087482

(51) Int. Cl.$^7$ ................................................. H02K 7/09
(52) U.S. Cl. ........................ 310/90.5; 384/106; 384/215
(58) Field of Search .......................... 310/90.5; 384/106, 384/215

(56) References Cited

U.S. PATENT DOCUMENTS

| | | | | |
|---|---|---|---|---|
| 4,274,683 A | | 6/1981 | Gray et al. ................... | 384/106 |
| 4,496,252 A | | 1/1985 | Hörler et al. ................. | 384/215 |
| 5,462,402 A | * | 10/1995 | Bakholdin et al. ............. | 415/90 |
| 5,708,312 A | * | 1/1998 | Rosen et al. .................. | 180/165 |
| 5,714,818 A | | 2/1998 | Eakman et al. ................ | 310/90.5 |
| 5,739,609 A | * | 4/1998 | Ueyama et al. ............... | 310/90.5 |
| 6,213,737 B1 | * | 4/2001 | Murakami et al. ........... | 310/90.5 |
| 6,262,505 B1 | * | 7/2001 | Hockney et al. .............. | 310/51 |
| 6,269,548 B1 | * | 8/2001 | Shinozaki et al. .............. | 34/58 |

FOREIGN PATENT DOCUMENTS

| | | | | |
|---|---|---|---|---|
| CH | 658499 | | 11/1986 | |
| DE | 934447 | | 10/1955 | |
| FR | 2614375 A1 | * | 10/1988 | ........... F16C/17/20 |
| JP | 64079415 A | * | 3/1989 | |
| JP | 05026237 A | * | 2/1993 | ........... F16C/32/00 |
| JP | 09236096 A | * | 9/1997 | ........... F04D/19/04 |
| JP | 11082522 A | * | 3/1999 | ........... F16C/33/66 |
| JP | 2000183436 A | * | 6/2000 | ........... H01S/3/225 |
| JP | 2000230550 A | * | 8/2000 | ........... F16C/32/04 |

OTHER PUBLICATIONS

Patent Abstracts of Japan, vol. 2000, No. 18, Jun. 5, 2001, Publication No. 01079415, publication date Mar. 24, 1989.

* cited by examiner

Primary Examiner—Joseph Waks
(74) Attorney, Agent, or Firm—Adams & Wilks (57) ABSTRACT

In a magnetic bearing apparatus provided at least with a touchdown bearing and a corrugated plate-like damper member inserted into an annular gap between the touchdown bearing and its retainer member, to keep on holding the corrugated plate-like damper member in a predetermined position without fail.

A cylindrical retainer member 9 is a thrust bearing retainer member and also a touchdown bearing retainer member. A touchdown bearing 4, i.e., a pair of roller bearings 4a and 4b disposed in upper and lower stages are received in an inner circumferential portion of the cylindrical retainer member 9. An annular gap G is formed between the inner circumferential surface of the cylindrical retainer member 9 and outer races of the pair of roller bearings 4a and 4b. A pair of corrugated strip steel plates 8a and 8b that are the corrugated plate-like damper members are inserted into this annular gap G. Also, a strip-like metal thin plate 10a is inserted while being clamped between the upper corrugated strip steel plate 8a and the lower corrugated strip steel plate 8b. Thus, the strip-like metal thin plate 10a functions as a positional offset preventing means of the pair of corrugated strip steel plates 8a and 8b.

20 Claims, 7 Drawing Sheets

PRIOR ART

MAGNETIC BEARING APPARATUS AND VACUUM PUMP HAVING MAGNETIC BEARING APPARATUS

CROSS-REFERENCE TO RELATED APPLICATIONS

This application is a U.S. national stage application of copending International Application Ser. No. PCT/JP00/02062, filed Mar. 31, 2000, claiming a priority date of Mar. 31, 1999, and published in a non-English language.

BACKGROUND OF THE INVENTION

1. Field of the Invention

The present invention relates to a magnetic bearing apparatus provided with a touchdown bearing made of a pair of roller bearings and a pair of corrugated plate-shaped damper members inserted into an annular gap formed between the touchdown bearing and its retainer member and to a vacuum pump having the magnetic bearing apparatus, and more particularly to an improvement in durability of a touchdown bearing and corrugated damper members for absorbing shock upon the touchdown and suppressing to a sufficiently low level a vibratory rotational frequency of a rotor relative to a rotational frequency of the rotor.

2. Background Information

A magnetic bearing apparatus provided at least with a rotor shaft, a radial magnetic bearing for supporting the rotor shaft in a radial direction, a thrust magnetic bearing for supporting the rotor shaft in an axial direction and a touchdown bearing is adopted in, for example, a vacuum pump such as a turbo molecular pump and has been extensively practiced. The above touchdown bearing is a protective bearing for receiving the above rotor shaft in case of emergency like a breakdown of the magnetic bearing and is composed of, for example, a pair of roller bearings arranged at a lower end portion of the above rotor shaft. Such a magnetic bearing apparatus and the turbo molecular pump provided with this are disclosed in JP-A-10-89284, JP-A-63-239397 and the like.

Figure 6:
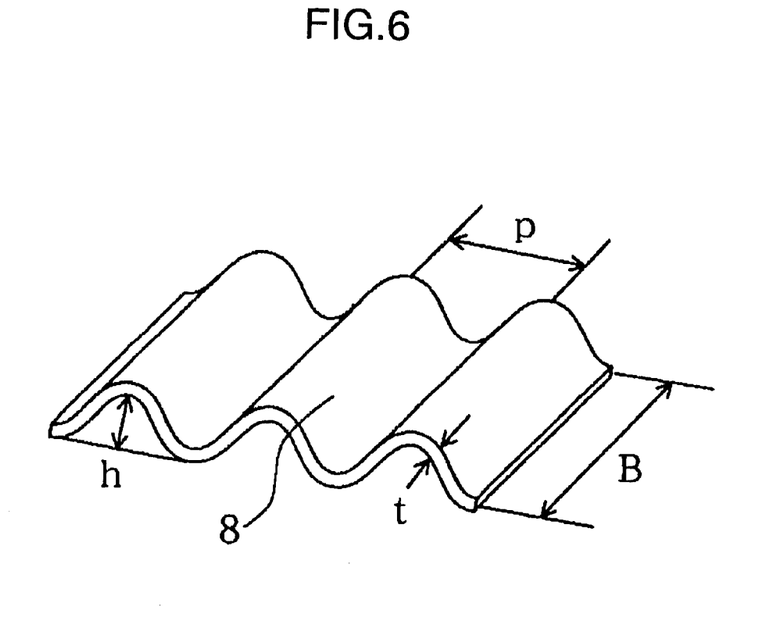
FIG. 6 is a partially perspective view of a corrugated strip steel plate that is a corrugated plate-like damper member.

Also, the corrugated plate-like damper member adopted in such a magnetic bearing apparatus is a member for suppressing a vibratory rotation, i.e., a swivel motion and simultaneously absorbing the shock of the touchdown when the rotor including the rotor shaft touches down to the touchdown bearing. This corrugated plate-like damper member functions as three members of a spring, a damper and a mechanical stop as one member as disclosed in JP-B-7-103894, and is, for example, a corrugated strip steel plate as shown in FIG. 6.

Figure 5:
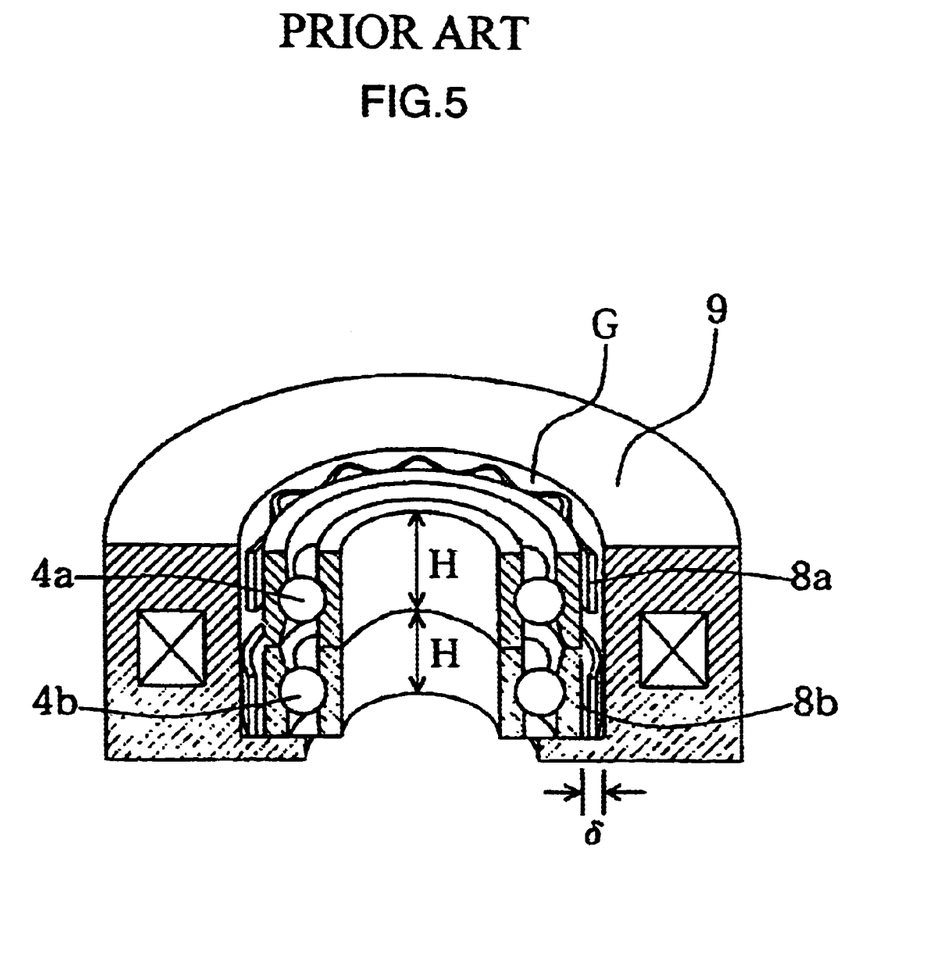
FIG. 5 is a partially perspective view of a touchdown bearing and a corrugated plate-like damper member of a conventional magnetic bearing apparatus.

In FIG. 5, the corrugated plate-like damper member is composed of a pair of corrugated strip steel plates 8a and 8b inserted into an annular gap G formed between outer races of a pair of roller bearings 4a and 4b constituting the touchdown bearing 4 and an inner circumferential surface of a retainer member 9 of the touchdown bearing. The frequency $f=(k/m)^{1/2}$ determined by the rigidity k of the corrugated strip steel plates 8a and 8b and the rotor mass m is identified with the vibratory rotational frequency of the rotor upon the touch down. The collision energy E upon the touchdown of the rotor is in proportion to the second powered value of the frequency f, i.e., (k/m). From these relationships, it will be understood that the smaller the rigidity k, the larger the effect of the corrugated strip steel plates 8a and 8b will become as the damper member. In order to reduce the rigidity k, it is available to reduce the thickness t of the corrugated strip steel plates 8a and 8b, for example, but the function of the corrugated strip steel plates 8a and 8b as the stop is degraded as the thickness t is decreased.

In order to cause the corrugated strip steel plate 8 to serve as a stop with a rigidity to some extent against the shock upon the touchdown of the rotor, the pitch p of the waveform, the height h under the non-load condition and the thickness t of the corrugated strip steel plate 8 could not be reduced as desired, as a result of which the width B has to be reduced. For this reason, the height H of the roller bearing would be twice greater than the width B of the corrugated strip steel plate 8 or more. In other words, in some cases, the corrugated strip steel plate 8 having a width that is less than half the height H of the roller bearing must be used. The corrugated strip steel plates 8a and 8b that have small pitch p, height h and thickness t and a width that is less than half the height H of the roller bearing are provided with a small retaining force. Accordingly, in the case where such corrugated strip steel plates 8a and 8b having the smaller width are inserted into the annular gap G, due to the vibration caused by the use for a long period of time, the upper corrugated strip steel plate 8a is offset downwardly so that it is brought into contact with the lower corrugated strip steel plate 8b. As a result, in some cases, the first rotary bearing 4a is kept free by width δ in the radial direction to be brought into contact with the rotor to generate abnormal noise or abnormal frictional wear. Incidentally, the width δ is the width of the annular gap G. In such a condition, the corrugated plate-like damper member could not exhibit the inherent function and could generate abnormal vibration or swing in the vacuum pump provided with the magnetic bearing apparatus or the magnetic bearing to bring about a breakdown in the apparatus as a whole.

The present invention provides a magnetic bearing apparatus provided at least with a rotor shaft, a radial magnetic bearing for supporting the rotor shaft in a radial direction, a thrust magnetic bearing for supporting the rotor shaft in an axial direction, a touchdown bearing composed of a pair of roller bearings arranged at a lower end portion of the above rotor shaft, and a pair of corrugated plate-shaped damper members inserted into an annular gap between the touchdown bearing and its retainer member, and to a vacuum pump provided the magnetic bearing apparatus. An object of the present invention is to securely maintain the pair of corrugated plate-shaped damper member in a predetermined position.

SUMMARY OF THE INVENTION

In order to solve the above-noted problems, there is provided a magnetic bearing apparatus provided at least with a rotor shaft, a radial magnetic bearing for supporting the rotor shaft in a radial direction, a thrust magnetic bearing for supporting the rotor shaft in an axial direction, a touchdown bearing composed of a pair of roller bearings arranged to surround a lower end portion of the rotor shaft, a pair of corrugated plate-shaped damper members inserted into an annular gap disposed between the touchdown bearing and its retainer member and positional offset preventing means for preventing positional offset of the corrugated plate-shaped damper members disposed in the annular gap.

Then, a metal thin plate interposed between the pair of corrugated plate-like damper members is used as the positional offset preventing means of the corrugated plate-like damper member.

Also, an annular convex portion formed in an inner circumferential surface of the retainer member is used as the positional offset preventing means of the corrugated plate-like damper member.

Further, an annular concave portion formed in an inner circumferential surface of the retainer member is used as the positional offset preventing means of the corrugated plate-like damper member.

Furthermore, when the positional offset preventing means of the corrugated plate-like damper member is constructed, a thickness of a metal thin plate, a sum (T+t) of a height of the annular convex portion or a depth of the annular concave portion T and a thickness t of a corrugated strip steel plate is 0.8 to 1.3 times of a width δ of the annular gap.

The present invention is also directed to a vacuum pump having the magnetic bearing apparatus according to the present invention.

DETAILED DESCRIPTION OF THE PREFERRED EMBODIMENTS

Preferred embodiments of the present invention will now be described with reference to FIGS. 1 to 7 in more detail.

Figure 7:
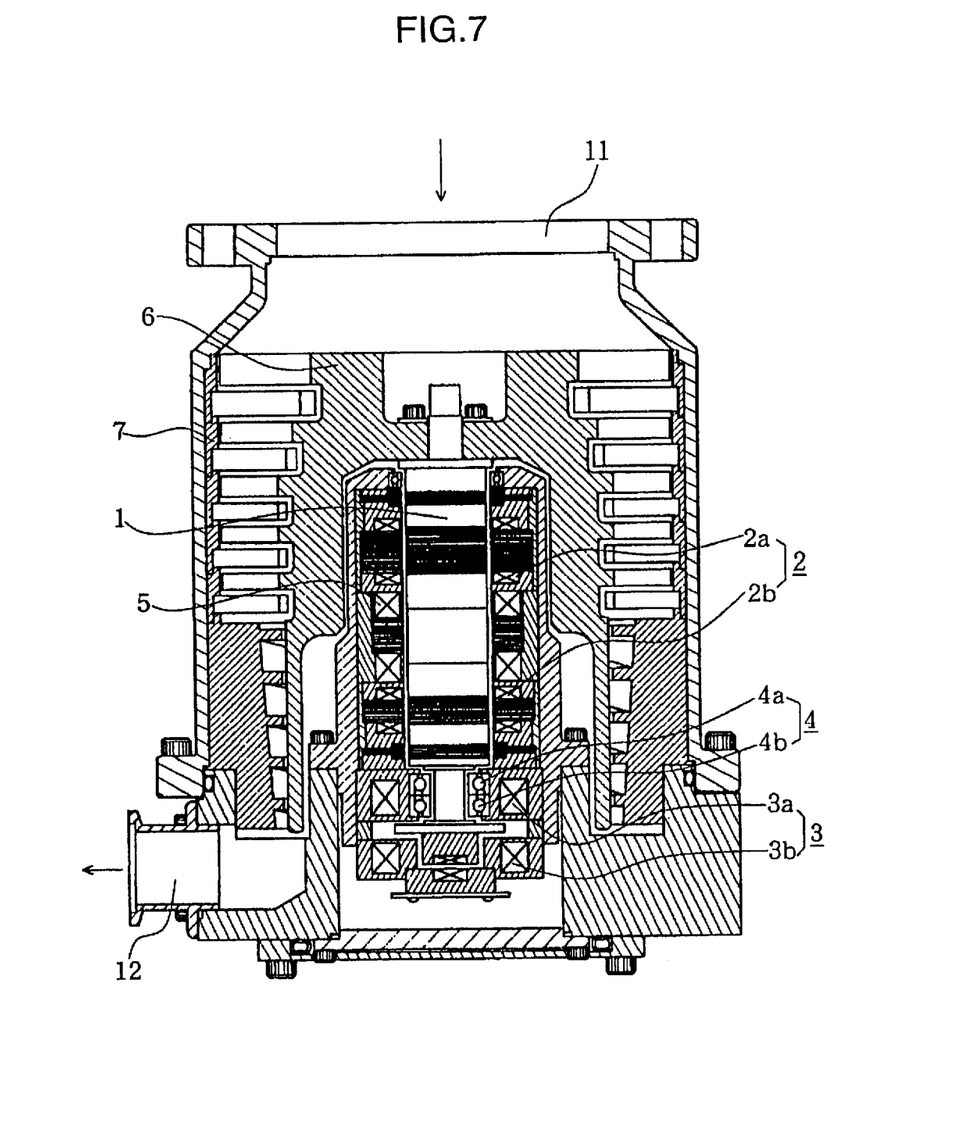
FIG. 7 is a longitudinal sectional view of one embodiment of a vacuum pump according to the present invention.

FIG. 7 is a longitudinal sectional view of one embodiment of a turbo molecular pump to which the present invention is applied. This turbo molecular pump has basically the same structure as that disclosed in JP-A-10-89284 and is composed of a rotor 6 including a rotor shaft 1, a stator 7 and a magnetic bearing apparatus for supporting the rotor 6 rotatably as desired. The rotor 6 includes a rotor cylindrical member in which a number of rotor blades are mounted on the upper side and a cylindrical portion having a flat outer circumferential surface is formed on the lower side beside the rotor shaft 1. The stator 7 includes a stator cylindrical member in which a number of stator blades are mounted on the upper side and a cylindrical portion having a screwed inner circumferential surface is formed on the lower side.

The above-described magnetic bearing apparatus is a so-called five axis controlling type magnetic bearing apparatus and is constituted of a radial magnetic bearing 2 composed of a first radial magnetic bearing 2a disposed on the upper side of the rotor shaft 1 and a second radial magnetic bearing 2b disposed on the lower side, a thrust magnetic bearing 3 composed of a first thrust magnetic bearing 3a and a second thrust magnetic bearing 3b disposed at a lower end portion of the rotor shaft 1, and a high frequency motor 5 disposed in an intermediate portion of the rotor shaft 1.

The above-described magnetic bearing apparatus further includes a touchdown bearing 4 disposed between the first thrust magnetic bearing 3a in an upper stage and the lower end portion of the rotor shaft and a corrugated plate-like damper member for absorbing the shock upon the touchdown and for attenuating the swivel frequency of the rotor. The touchdown bearing 4 is composed of a pair of roller bearings disposed in upper and lower stages, i.e., a first roller bearing 4a and a second roller bearing 4b. Although not shown in FIG. 7, the corrugated plate-like damper member is inserted into the annular gap formed between the touchdown bearing 4 and the retainer member thereof.

Figure 1:
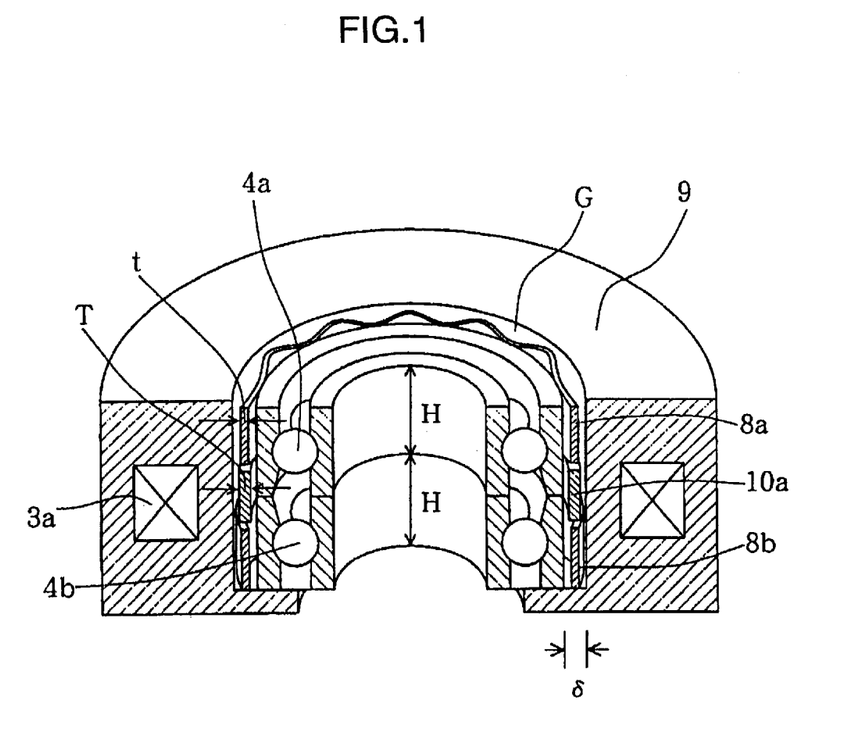
FIG. 1 is a partially perspective view of a touchdown bearing and a corrugated plate-like damper member in accordance with a first embodiment of a magnetic bearing apparatus of the present invention.

In FIG. 1 showing a first embodiment of the present invention, a cylindrical retainer member 9 serves as both the thrust bearing retainer member and the touchdown bearing retainer member. Namely, the retainer member 9 is the retainer member coated with resin mold and formed into a cylinder for receiving electromagnets constituting the thrust bearing 3a of FIG. 7. Then, the touchdown bearing 4, i.e., the pair of roller bearings 4a and 4b disposed in the upper and lower stages are received in the inner circumferential portion of the retainer member 9. The annular gap G is formed between the inner circumferential surface of the cylindrical retainer member 9 and the outer races of the pair of roller bearings 4a and 4b, a pair of corrugated strip steel plates 8a and 8b that form the corrugated plate-shaped damper members are inserted into this annular gap G, and a strip-like metal thin plate 10a is inserted while being clamped by the upper corrugated strip steel plate 8a and the lower corrugated strip steel plate 8b. The corrugated strip steel plates 8a and 8b are, for instance, the corrugated strip steel plates as shown in FIG. 6.

The pair of roller bearings 4a and 4b are depressed in the radial direction by the elasticity of the corrugated strip steel plates 8a and 8b and retained over the inner circumferential portion of the retainer member 9. The corrugated strip steel plates 8a and 8b are also retained in a predetermined axial position within the annular gap G by the elasticity thereof. In addition, since the corrugated strip plates 8a and 8b are inserted into the annular gap G through the strip-like metal thin plate 10a in the axial direction, there is no axial positional offset or drop, i.e., axial displacement, and the plates are always retained in the predetermined axial position without fail. The strip-like metal thin plate 10a constitutes a means for preventing the axial positional offset of the corrugated plate-like damper member.

By the way, the selection of the metal thin plate 10a and the determination of the width δ of the annular gap relate to the thickness T of the metal thin plate 10a, the thickness t of the corrugated strip steel plates and the width δ of the annular gap mutually. In the case where the value obtained by subtracting the thickness t of the corrugated strip steel plates from the width δ of the annular gap is small, the movable amount of the corrugated portion of the corrugated strip steel plates, i.e., the radial movable amount of the rotor is reduced, resulting in disability to obtain the necessary elastic force. Inversely, in the case where the value obtained by subtracting the thickness t of the corrugated strip steel plates from the width δ of the annular gap is large, the effect to prevent the positional offset of the metal thin plate is diminished. Therefore, according to the first embodiment, the selection of the metal thin plate 10a and the determination of the width δ of the annular gap are performed so that the sum (T+t) of the thickness T of the metal thin plate 10a and the thickness t of the corrugated strip steel plates is 0.8 to 1.3 times of the width δ of the annular gap. Thus, the effect to prevent the positional offset of the corrugated plate-like damper member is further enhanced.

Figure 2:
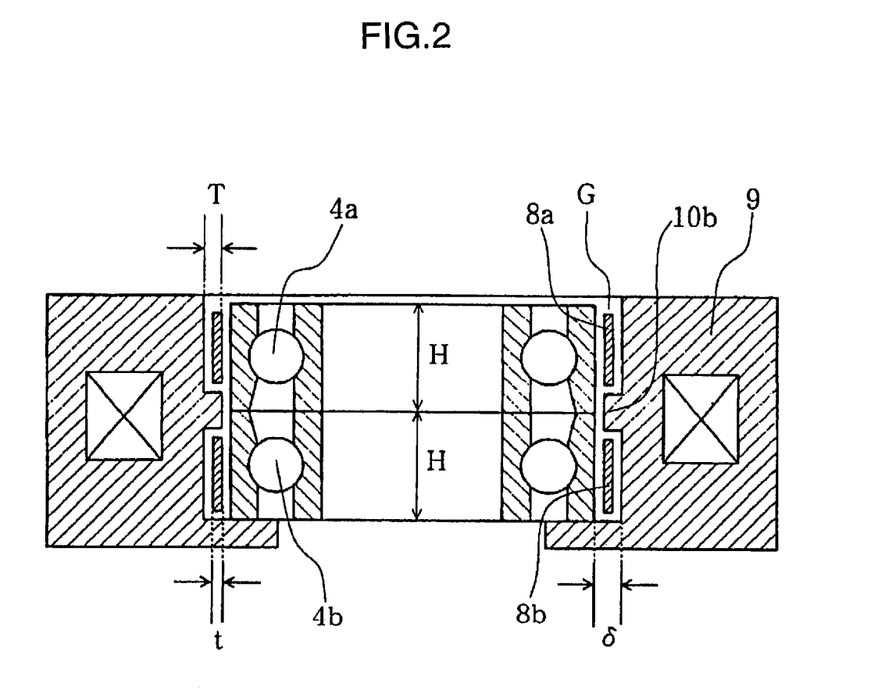
FIG. 2 is a cross-sectional view of a touchdown bearing and a corrugated plate-like damper member in accordance with a second embodiment of a magnetic bearing apparatus of the present invention.

In FIG. 2 showing a second embodiment of the present invention, the positional offset preventing means of the corrugated plate-like damper member is an annular convex portion 10b formed on the inner circumferential surface of a cylindrical retainer member 9. An annular gap G is divided into the upper and lower stages by this annular convex portion 10b. Then, a corrugated strip steel plate 8b and a corrugated strip steel plate 8a are inserted into the lower annular gap and the upper annular gap, respectively. Accordingly, also in the second embodiment, the corrugated strip steel plates 8a and 8b are always held in a predetermined axial position of the annular gap G without fail. The height T of the annular convex portion and the width δ of the annular gap are determined so that the sum (T+t) of the height T of the annular convex portion and the thickness t of the corrugated strip steel plates is 0.8 and 1.3 times of the width δ of the annular gap. Thus, the effect to prevent axial positional offset or axial displacement of the corrugated plate-like damper member is further enhanced.

Figure 3:
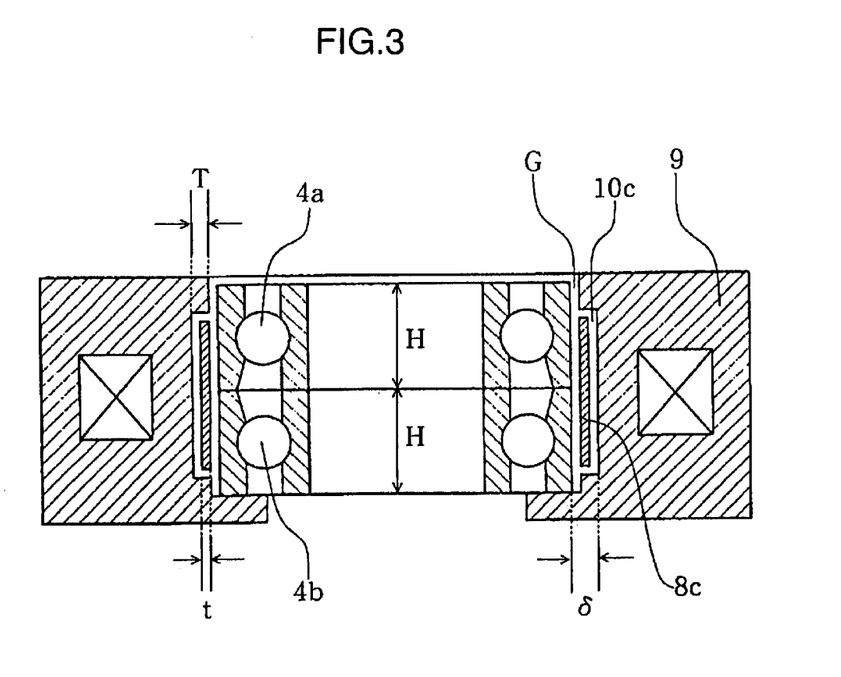
FIG. 3 is a cross-sectional view of a touchdown bearing and a corrugated plate-like damper member in accordance with a third embodiment of a magnetic bearing apparatus of the present invention.

In FIG. 3 showing a third embodiment of the present invention, the positional offset preventing means of the corrugated plate-like damper member is an annular concave portion 10c formed in the inner circumferential surface of the cylindrical retainer member 9. A single corrugated strip steel plate 8c is inserted into this annular concave portion 10c. Accordingly, also in the third embodiment, the corrugated strip steel plate 8c is always held in a predetermined axial position of an annular gap G without fail. The depth T of the annular concave portion and the width δ of the annular gap are determined so that the sum (T+t) of the depth T of the annular concave portion and the thickness t of the corrugated strip steel plate is 0.8 and 1.3 times of the width δ of the annular gap. Thus, the effect to prevent the axial positional offset or axial displacement of the corrugated plate-like damper member is further enhanced. In the first embodiment and the second embodiment, two corrugated plate-like damper members are used. However, in the third embodiment, the single wide corrugated plate-like damper member is used, thereby the cost is advantageously reduced.

In the present invention, the sum (T+t) of the height of the metal thin plate, the height of the annular convex portion or the depth of the annular concave portion T and the thickness t of the corrugated strip steel plate is 0.8 to 1.3 times of the width δ of the annular gap. The reason for this is as follows.

For example, assume that in the embodiment in which the thickness t of the corrugated strip steel plates is 0.1 mm, the height h of the corrugated strip steel plates is 0.25 mm and the width δ of the annular gap is 0.2 mm, the corrugated strip steel plates are buckled or aged due to the use for a long period of time, or the height becomes h'. The height h of the corrugated strip steel plates becomes half the length of 0.25 mm and h' becomes 0.125 mm. In order that the corrugated strip steel plate buckled or aged due to the use for a long period time serves as the corrugated plate-like damper member, the relation, δ<(h'+T) should be established. This is the reason why the corrugated strip steel plates are offset from the predetermined position unless this relationship is met. If the above-described values are substituted into this formula, the relationship, T>0.075 mm, is established. If the thickness t=0.1 mm is added to the right side and the left side of this formula, the relationship, (T+t)>0.175 mm is given. This value, 0.175 mm, is about 0.8 times of the width δ=0.2 mm of the annular gap.

Also, the movable amount χ (amount of change of the corrugated plate-like damper member) of the rotor that is necessary upon the touchdown of the rotor is represented by χ=(δ−t)/2. When the above-described value is substituted for this, the relationship, χ=0.05 mm is obtained. In order not to limit the motion of the rotor by the depth T of the annular concave portion or the height of the annular convex portion and the thickness of the metal thin plate, it is necessary to meet the relationship, (δ−χ)>T. If the above-described values are substituted into this formula, it is possible to obtain T<0.15 mm. If the thickness t=0.1 mm is added to the right side and the left side of this formula, the relationship, (T+t)<0.25 mm is given. This value, 0.25 mm, is about 1.3 times of the width δ=0.2 mm of the annular gap.

By the way, in the first embodiment shown in FIG. 1, the pair of corrugated strip steel plates 8a and 8b that constitute the corrugated plate-like damper member and the metal thin plate 10a clamped by these plates have portions in contact with each other at the end faces in the axial direction. Therefore, the corrugated strip steel plates 8a and 8b are prevented from serving as springs. Namely, when the mass of the rotor is m and the spring rigidity of the corrugated plate-like damper member is k, the proper frequency f [Hz] upon the touchdown of the rotor is represented by f=(½π)(k/m)$^{1/2}$. The energy E applied to the cylindrical retainer member 9 upon the touchdown has a proportional relation with the product mf$^2$ of the second powered value f$^2$ of the frequency f and the mass m. For instance, in the case where the proper frequency f is one third of the rated rotation frequency $f_0$ of the rotor, the above-described energy E may be reduced one ninth theoretically by the corrugated plate-like damper member. However, since the pair of corrugated strip steel plates 8a and 8b and the metal thin plate 10a clamped by these plates have portions in contact with each other at the end faces in the axial direction, the corrugated plate-like damper member is prevented from serving as the spring. If so, there is a problem that the effect of the corrugated plate-like damper member for considerably reducing the energy E applied to the cylindrical retainer member 9 upon the touchdown would be degraded.

Figure 4:
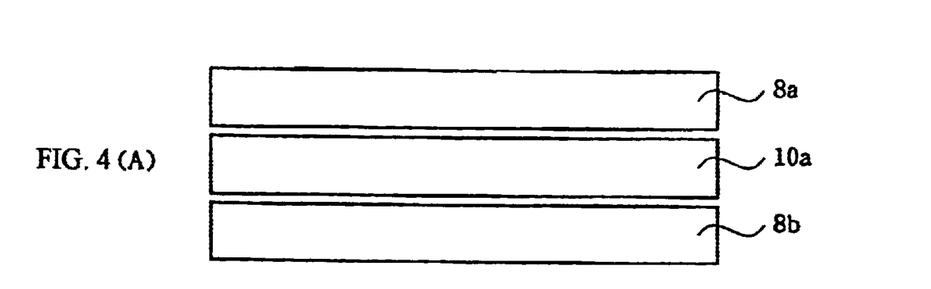
FIGS. 4A to 4E is a developed view showing various embodiments of an upper stage corrugated strip steel plate 8a, a lower stage corrugated strip steel plate 8b and a strip-like metal thin plate 10a clamped therebetween in accordance with the first embodiment of the magnetic bearing apparatus of the present invention.

Various embodiments for solving this problem are shown in FIG. 4. In any of the modified embodiments of FIGS. 4(B) to FIG. 4(E) which are modifications to the basic embodiment of FIG. 4(A), the contact portion in the axial direction is reduced. Namely, FIG. 4(B) shows an embodiment in which a rectangular corrugated strip steel plate 8a without any cutaway portion, a rectangular corrugated strip steel plate 8b without any cutaway portion and a rectangular thin steel plate 10a with cutaway portions in the upper and lower side surfaces are used in combination. FIG. 4(C) shows an embodiment in which a rectangular corrugated strip steel plate 8a with cutaway portions in the lower side surface, a rectangular corrugated strip steel plate 8b with cutaway portions in the upper side surface and a rectangular thin steel plate 10a without any cutaway portion are used in combination. Furthermore, FIG. 4(D) shows an embodiment in which a rectangular corrugated strip steel plate 8a with cutaway portions in the upper side surface, a rectangular corrugated strip steel plate 8b with cutaway portions in the lower side surface and a rectangular thin steel plate 10a without any cutaway portion are used in combination. Moreover, FIG. 4(E) shows an embodiment in which a rectangular corrugated strip steel plate 8a with cutaway portions in the upper and lower side surfaces, a rectangular corrugated strip steel plate 8b with cutaway portions in the upper and lower side surfaces and a rectangular thin steel plate 10a without any cutaway portion are used in combination.

The energy reduction effect by these modified embodiments will now be described. The entire energy $E_{t1}$ upon the touchdown in the basic embodiment of FIG. 4(A) is represented by $E_{t1}=\alpha\{(G_1/2\pi)f^2+(G_2/2\pi)f_0^2\}$ where $\alpha$ is the proportional constant. Then in the case where the proper frequency f is one third of the rated rotational frequency $f_0$ of the rotor, the entire energy $E_{t1}$ is $E_{t1}=\alpha(f_0^2/2\pi)G_1/9+G_2)$ where $G_1$ is the vibration level of the rotor upon the touchdown and $G_2$ is the vibration level at the rated rotational frequency.

The vibration level $G_1$ of the rotor upon the touchdown in case of the basic embodiment of FIG. 4(A) is 0.5 and the vibration level $G_2$ at the rated rotational frequency of the rotor is 0.1. Accordingly, the entire energy $E_{t1}$ upon the touchdown is represented by $E_{t1}=\alpha(f_0^2/2\pi)0.5/9+0.1)=0.156\alpha(f_0^2/2\pi)$.

In the modified embodiments of FIG. 4(B) to FIG. 4(E), the entire energy $E_{t2}$ upon the touchdown is represented by $E_{t2}=\alpha\{(G_3/2\pi)f^2+(G_4/2\pi)f_0^2\}$. In the case where the proper frequency f is one third of the rated rotational frequency $f_0$ of the rotor, the entire energy $E_{t2}$ is represented by $E_{t2}=\alpha(f_0^2/2\pi)(G_3/9+G_4)$ where $G_3$ is the vibration level of the rotor upon the touchdown in the case where the contact portion of the corrugated plate-like damper member to the metal thin plate is one third of the non-contact portion, and $G_4$ is the vibration level at the rated rotational frequency of the rotor.

The vibration level $G_3$ of the rotor upon the touchdown in case of the modified embodiments of FIG. 4(B) and FIG. 4(C) is 1.0 and the vibration level $G_4$ at the rated rotational frequency of the rotor is 0.01. Accordingly, the entire energy $E_{t2}$ upon the touchdown is represented by $E_{t2}=\alpha(f_0^2/2\pi)(1/9+0.01)=0.121\alpha(f_0^2/2\pi)$. This is 78% of the entire energy of $0.156\alpha(f_0^2/2\pi)$ upon the touchdown in the basic embodiment. Therefore, according to the modified embodiments of FIG. 4(B) and FIG. 4(C), it is possible to further reduce the energy by 22% compared with the basic embodiment of FIG. 4(A). In the same manner, also in the modified embodiments of FIG. 4(D) and FIG. 4(E), it is possible to further reduce the energy compared with the basic embodiment of FIG. 4(A).

Incidentally, in FIGS. 1 to 3, the cylindrical retainer member 9 is the retainer member that receives electromagnets forming the thrust bearing 3a, molded of resin and formed into a cylindrical shape. However, this may be formed with another structure, for example, a structure integral with a stator column of the magnetic bearing apparatus.

INDUSTRIAL APPLICABILITY

According to the present invention, there is provided a magnetic bearing apparatus provided at least with a touchdown bearing, a corrugated plate-shaped damper member inserted into an annular gap with a retainer member thereof and a positional offset preventing means for preventing the positional offset of the corrugated plate-shaped damper member in the annular gap. Accordingly, since the corrugated plate-shaped damper member is held in a predetermined position without fail even if it comprises a narrow corrugated strip steel plate, the corrugated plate-shaped damper member is prevented from being offset, thereby preventing abnormal contact between the rotor and the touchdown bearing. In addition, since the positional offset preventing means for the above corrugated plated-like damper member is simple in structure, it is possible to reduce an increase in the manufacture cost as much as possible. Furthermore, there is no positional offset, and there is no unduly strong external force. Thus, the durability of the corrugated plate-shaped damper member per se is enhanced and the necessity to exchange such part during overhaul is obviated.

What is claimed is:

1. A magnetic bearing apparatus comprising: a rotor shaft; a radial magnetic bearing for supporting the rotor shaft in a radial direction; a thrust magnetic bearing for supporting the rotor shaft in an axial direction; a touchdown bearing surrounding a lower end portion of the rotor shaft; a retainer member for supporting the touchdown bearing; a corrugated plate-shaped damper disposed in an annular gap between the touchdown bearing and the retainer member; and positional offset preventing means for preventing axial positional offset of the corrugated plate-shaped damper.

2. A magnetic bearing apparatus according to claim 1; wherein the corrugated plate-shaped damper comprises a pair of corrugated plate-shaped damper members; and wherein the positional offset preventing means comprises a thin metal plate interposed between the pair of corrugated plate-shaped damper members.

3. A magnetic bearing apparatus according to claim 2; wherein a sum of a thickness of the thin metal plate and a thickness of one of the corrugated plate-shaped damper members is 0.8 to 1.3 times a width of the annular gap.

4. A magnetic bearing apparatus according to claim 3; wherein each of the corrugated plate-shaped damper members comprises a corrugated strip of steel.

5. A magnetic bearing apparatus according to claim 1; wherein the corrugated plate-shaped damper comprises a pair of corrugated plate-shaped damper members; and wherein the positional offset preventing means comprises an annular convex portion formed in an inner circumferential surface of the retainer member for separating the pair of corrugated plate-shaped damper members.

6. A magnetic bearing apparatus according to claim 5; wherein a sum of a height of the annular convex portion and a thickness of one of the corrugated plate-shaped damper members is 0.8 and 1.3 times of a width of the annular gap.

7. A magnetic bearing apparatus according to claim 6; wherein each of the corrugated plate-shaped damper members comprises a corrugated strip of steel.

8. A magnetic bearing apparatus according to claim 1; wherein the positional offset preventing means comprises an annular concave portion formed in an inner circumferential surface of the retainer member for receiving the corrugated plate-shaped damper.

9. A magnetic bearing apparatus according to claim 8; wherein a sum of a depth of the annular concave portion and a thickness of the corrugated plate-shaped damper is 0.8 to 1.3 times a width of the annular gap.

10. A magnetic bearing apparatus according to claim 9; wherein the corrugated plate-shaped damper comprises a corrugated strip of steel.

11. A vacuum pump having a magnetic bearing apparatus according to claim 1.

12. A magnetic bearing apparatus comprising: a rotor shaft; a radial magnetic bearing for supporting the rotor shaft in a radial direction; a thrust magnetic bearing for supporting the rotor shaft in an axial direction; a pair of roller bearings having inner and outer race members and disposed between the thrust magnetic bearing and a portion of the rotor shaft; a retainer member surrounding the pair of roller bearings and forming an annular gap between the outer race members and an inner circumferential surface of the retainer member; a pair of corrugated damper members disposed in the annular gap; and positional offset preventing means for preventing a positional offset of the corrugated damper members.

13. A magnetic bearing apparatus according to claim 12; wherein the positional offset preventing means comprises a strip of metal disposed between the corrugated damper members.

14. A magnetic bearing apparatus according to claim 13; wherein a sum of a thickness of the strip of metal and a thickness of one of the corrugated damper members is 0.8 to 1.3 times a width of the annular gap.

15. A magnetic bearing apparatus according to claim 12; wherein the positional offset preventing means comprises an annular portion extending from the inner circumferential surface of the retainer member.

16. A magnetic bearing apparatus according to claim 15; wherein a sum of a thickness of the annular portion in the radial direction and a thickness of one of the corrugated damper members is 0.8 and 1.3 times of a width of the annular gap.

17. A magnetic bearing apparatus according to claim 15; wherein the annular portion extends into the annular gap and divides the annular gap into a pair of annular gap portions each receiving a respective one of the corrugated damper members.

18. A magnetic bearing apparatus comprising: a rotor shaft; a radial magnetic bearing for supporting the rotor shaft in a radial direction; a thrust magnetic bearing for supporting the rotor shaft in an axial direction; a pair of roller bearings having inner and outer race members and disposed between the thrust magnetic bearing and a portion of the rotor shaft; a retainer member surrounding the pair of roller bearings and forming an annular gap between the outer race members and an inner circumferential surface of the retainer member, the retainer member having an annular recess formed in the inner circumferential surface thereof and communicating with the annular gap; and a corrugated damper member disposed in the annular recess of the retaining member.

19. A magnetic bearing apparatus according to claim 18; wherein a sum of a depth of the annular recess of the retainer member and a thickness of the corrugated damper member is 0.8 to 1.3 times a width of the annular gap.

20. A magnetic bearing apparatus according to claim 18; wherein the corrugated damper member comprises a single strip of metal.

* * * * *